United States Patent [19]

Pfeiffer

[11] 4,417,865

[45] Nov. 29, 1983

[54] CONTINUOUSLY OPERATING PRESS

[75] Inventor: Heinrich Pfeiffer, Eppingen, Fed. Rep. of Germany

[73] Assignee: Maschinenfabrik J. Dieffenbacher GmbH Co., Eppingen, Fed. Rep. of Germany

[21] Appl. No.: 318,933

[22] Filed: Nov. 6, 1981

Related U.S. Application Data

[63] Continuation-in-part of Ser. No. 286,315, Jul. 24, 1981.

[30] Foreign Application Priority Data

Nov. 14, 1980 [DE] Fed. Rep. of Germany ....... 3042972

[51] Int. Cl.$^3$ ................................................ B29J 5/04

[52] U.S. Cl. ...................................... 425/371; 425/373

[58] Field of Search ................. 425/371, 373; 156/580

[56] References Cited

U.S. PATENT DOCUMENTS 3,851,685 12/1974 Arhweiler et al. ................. 425/371

3,883,285 5/1975 De Mets ............................. 425/371

3,926,542 12/1975 Arhweiler ........................... 425/371

3,942,929 3/1976 De Mets ............................. 425/371

4,128,369 12/1978 Kemerer et al. .................... 425/371

4,216,179 8/1980 Lamberts et al. .................. 425/371

*Primary Examiner*—James R. Hall

*Attorney, Agent, or Firm*—Schwartz, Jeffery, Schwaab, Mack, Blumenthal & Koch

[57] ABSTRACT

The press contains a platen and a ram adjustably mounted with respect to the platen to define a press gap for receiving material. A first conveyor band is disposed around the platen and a second conveyor band is disposed around the ram. A plurality of rolls for supporting and guiding the first and second bands are mounted to the platen and ram, respectively. Countersupports are provided for the rolls. The countersupports comprise a plurality of change plates, each of which is capable of being mounted to and removed from a platen or ram. Each change plate includes a first rod mounted in a first level and connected in supporting relation with one of the rolls. A plurality of T-shaped web plates are connected to the first rod in the first level and to a pressure plate in a second level whereby counter-pressure from the material being pressed is transferred to the pressure plate.

8 Claims, 13 Drawing Figures

CONTINUOUSLY OPERATING PRESS

This is a continuation-in-part application of U.S. application Ser. No. 286,315, filed July 24, 1981, the disclosure of which is incorporated herein by reference.

BACKGROUND OF THE INVENTION

The present invention relates to a continuously operating apparatus for pressing and producing particleboard and fiber board. In a modified form it may be used to make plywood.

According to the above-mentioned parent application Ser. No. 286,315, web plates are arranged between pressure plates and threaded alternatingly with them on connecting rods or bearing pipes. The number of web plates, as the pillow blocks for the rolls, also determines the corresponding number of pressure plates. The manufacturing costs of these numerous individual parts are thus proportionally high.

The present invention has the object of simplifying the apparatus referred to in the parent application, in particular to obtain both a more cost effective manufacturing process and an improved transfer of heat to the rolls and the steel bands of the press.

In accordance with the above and other objects, the present invention is an apparatus incorporating a continuously operating press which comprises a fixed platen and a movable platen which is adjustably mounted with respect to the fixed platen to define a press gap for receiving material to be pressed. A first conveyor band is disposed around the fixed platen and a second conveyor band is disposed around the movable platen. A plurality of rolls are provided for supporting and guiding the first and second bands. Support structures are provided which support the rolls. The support structures comprise a plurality of change plates, each of which is capable of being mounted to and removed from the fixed platen or the movable platen. Each change plate includes a first rod mounted in a first level and connected in supporting relation with one of the rolls. A plurality of T-shaped web plates are connected to the first rod in the first level and to a pressure plate in a second level, whereby counter-pressure from the material being pressed is transferred to the pressure plate. The pressure plate of each change plate may be equipped with heating channels in the form of bores for direct heating of the rolls. Also, the pressure plate and a plurality of the web plates of each change plate may be made of a single piece. Further, all of the web plates and the associated common pressure plate of a change plate may be made of a single piece.

Each roll is mounted on a rod. The rods may be spaced at different distances from each other, and the rolls may be made to have different diameters. Each change plate may be dimensioned narrowly so that it contains only one bearing plate for either of the rods. Also, the T-shaped web plates may be formed with cutouts between each axle in the web to the foot of the web plates or to the pressure plates.

BRIEF DESCRIPTION OF THE DRAWINGS

Several embodiments of the pressure according to the present invention are shown in the drawings and shall be described in detail hereinafter.

In the drawings.

DETAILED DESCRIPTION OF THE PREFERRED EMBODIMENTS

Figure 1:
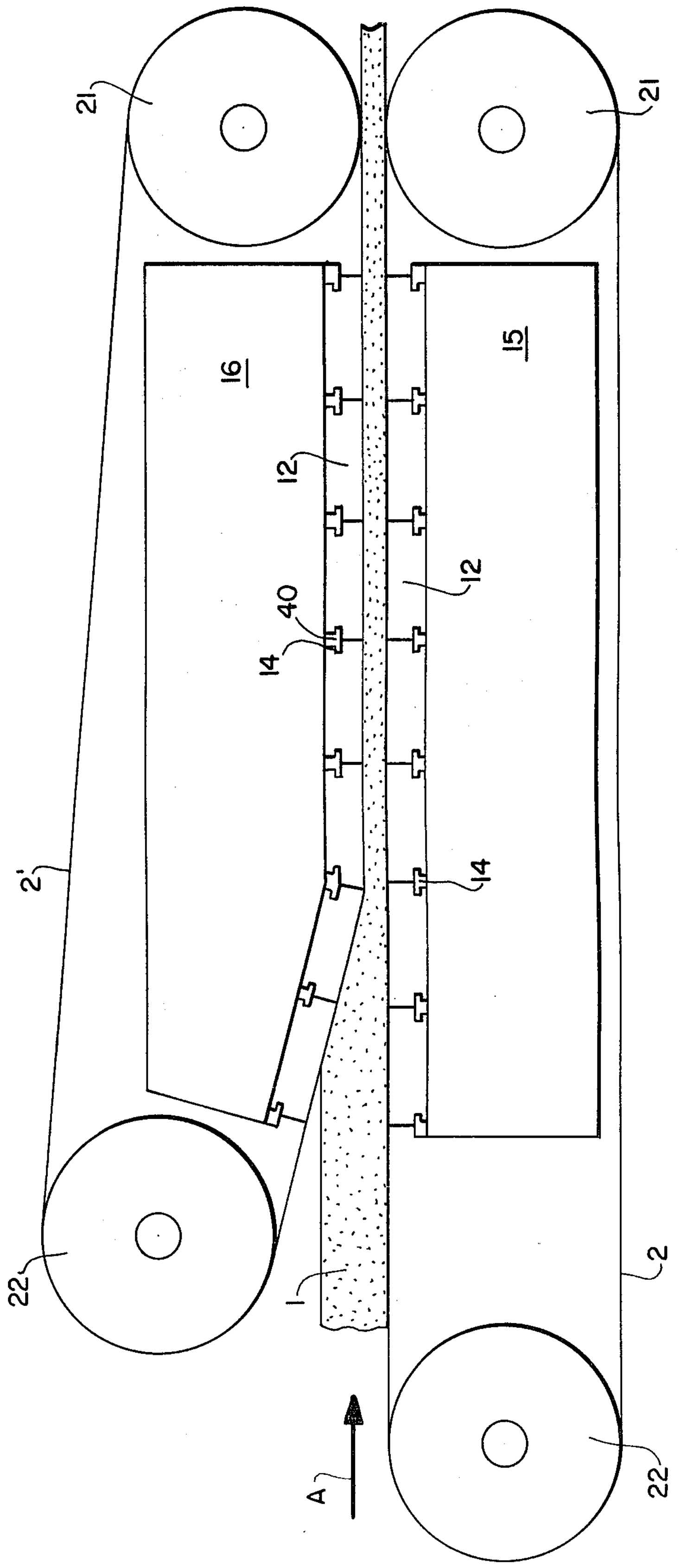
FIG. 1 schematically shows a continuously operating press according to the present invention in a lateral elevation.

FIG. 1 shows the apparatus of the present invention receiving ligno-cellulosic particulate material 1 to be formed into particleboard or the like.

According to FIG. 1, the apparatus consists of a lower platen 15 which is fixed, an upper platen 16 which may be moved vertically, and draw bars connecting them (not shown). To set the press gap, the upper platen 16 is moved up and down by hydraulic cylinders (not shown) and stopped in the position desired. Steel bands 2 and 2' are guided by means of a drive roll 21 and a reversing roll 22 each, around the lower platen 15 and the upper platen 16, respectively. As material 1 is conveyed through the apparatus in the direction of arrow A, it is compressed and formed into the final product.

According to the invention, the supporting elements of the lower platen 15 and the upper platen 16 consist of removable change plates 12, which consist of an assembly of elements to be described. The individual embodiments of the change plates 12, 12', 12'', and 12''' as shown in FIGS. 2 to 9, include both bearing supports for the rolls 3, 3' and an installation for the heating and cooling system. The structural layout of the roll supports is designed such that the counterpressure originating in the piece being pressed is transferred by the rolls 3 and 3' through the web plates 23 with a high specific pressure and through pressure plates 24 onto the mounting plate 10, with a low specific pressure. This is intended to protect the insulating plate 9 provided between the pressure plate 24 and the mounting plate 10 in order to prevent the radiative transfer of heat to the lower platen 15 and the upper platen 16. According to FIGS. 2 to 5, the web plates 23 are in the form of T beams. This shape promotes good heat transfer both in the case of indirect heating through the bores 25 of the pressure plate 24, shown in FIGS. 2 and 3, and in the case of direct heating of the rolls 3 by way of support pipes 26, shown in FIGS. 4 and 5.

In certain manufacturing processes, it is necessary to provide the highest possible heat capacities for the material to be pressed. For this purpose, the change plates 12″ and 12‴ according to FIGS. *6a, 6b, 7a, 7b, 8a, 8b, 9a* and *9b* are particularly suitable. In these embodiments, a web plate 27 and a component 30 of the pressure plates are made of a single piece, respectively. As shown in FIGS. *6b, 7b, 8b* and *9b*, all web plates 28 and the pressure plate 29 of a change plate are made of a single piece.

According to FIGS. *6a, 7a, 8a* and *9a*, the structure of change plates 12″ and 12‴ consists of several web plates 27, each being made in a unitary piece with a component 30 of the pressure plates, and alternatingly and successively threaded onto rods 6 and pipes 7, while tie rods maintain the structural parts together under pretension. Subsequently, in a first level, the rolls 3′ may be threaded onto rods 6 by insertion of the rods 6 in the bores of the web plates 27 provided for the purpose. The rods 6 and pipes 7 are secured at the two outer web plates 28. This assembly is secured by means of several threaded bolts 13, after the insertion of the insulating plate 9, onto the mounting plate 10. The fastening of the change plates 12 is then effected by the insertion of their mounting grooves 14 onto the splines 40 on the lower platen 15 and the upper platen 16. Splines 40 fit into the mating faces of groove 14 to hold the change plates 12 in place.

Figure 2:
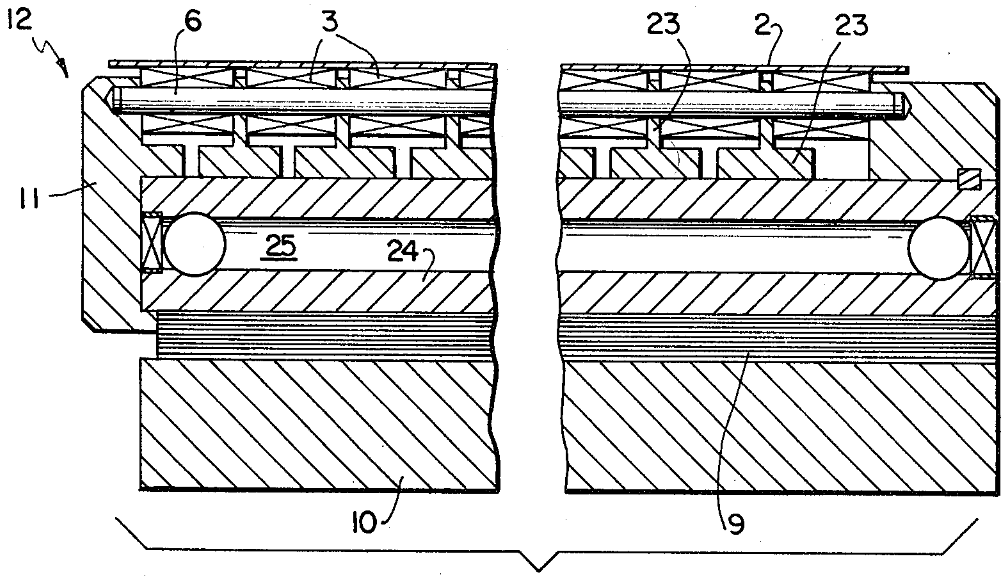
FIG. 2 shows a change plate according to the present invention in a cross-section transverse to the direction of passage of material through the press.
Figure 3:
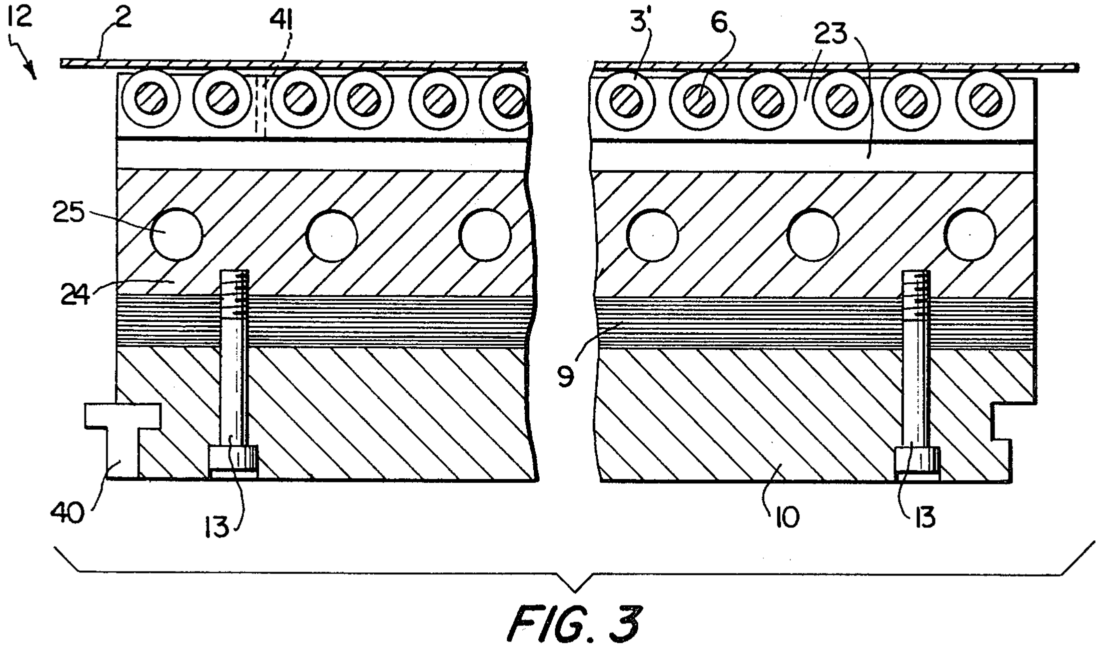
FIG. 3 shows the change plate according to FIG. 2 in a cross-section longitudinally to the direction of passage of material through the press.
Figure 4:
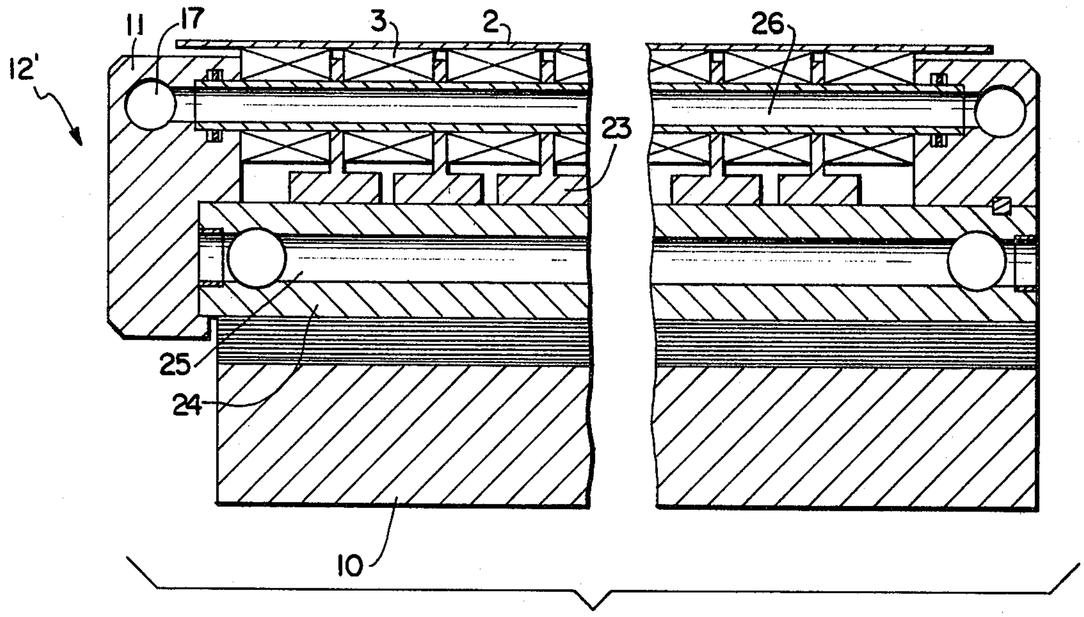
FIG. 4 shows a change plate in a cross-section transverse to the direction of passage of material through the press.
Figure 5:
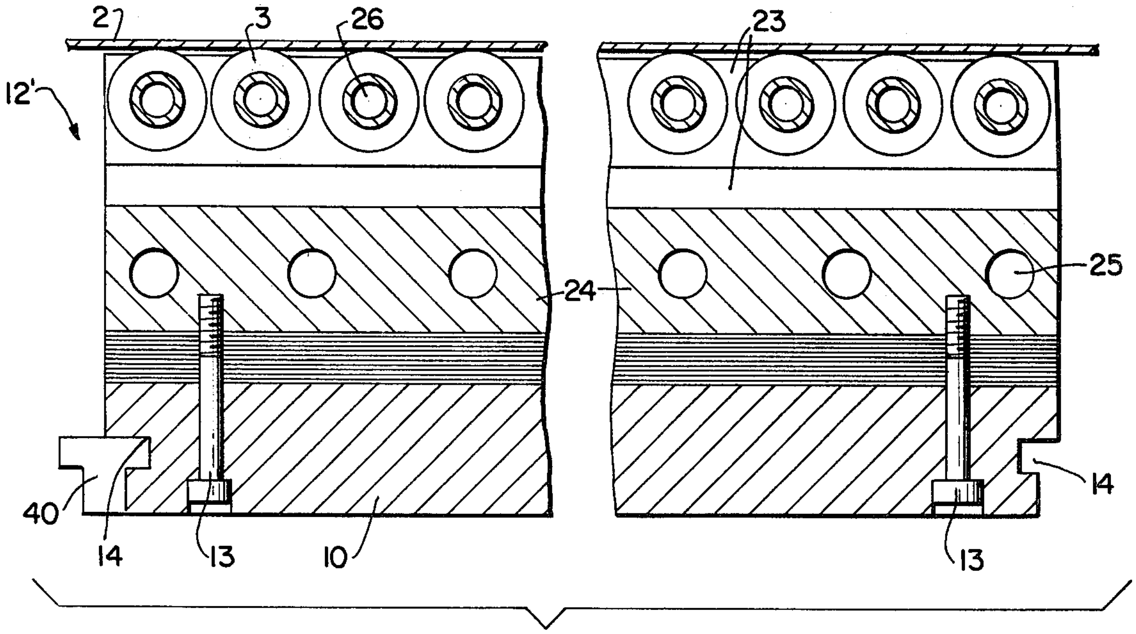
FIG. 5 shows the change plate of FIG. 4 in a cross-section longitudinally to the direction of passage of material through the press.
Figure 6A:
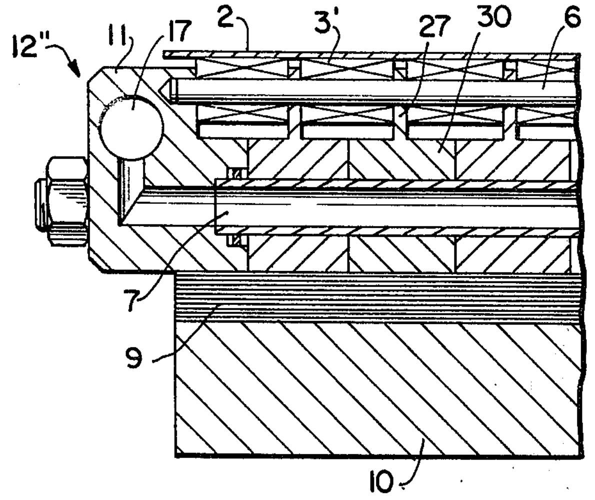
FIGS. 6*a* and 6*b* show change plates in a cross-section transverse to the direction of passage of material through the press.
Figure 6B:
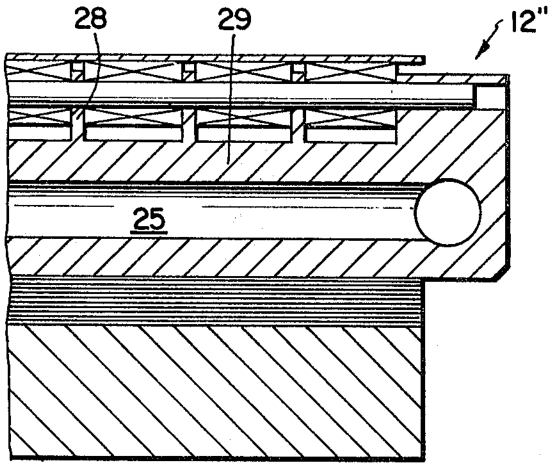
Figure 7A:
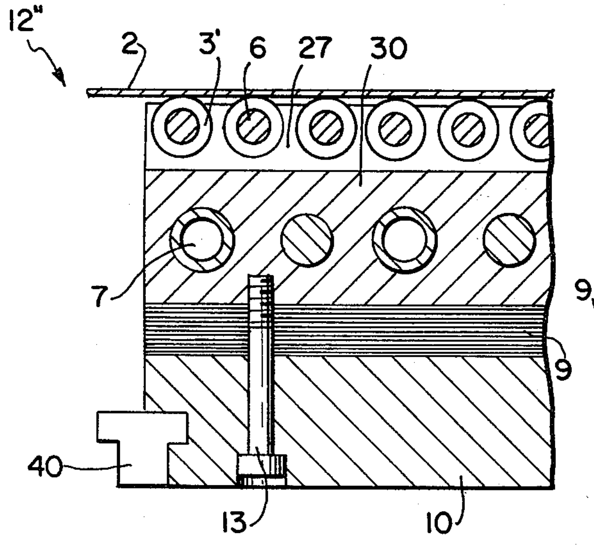
FIGS. 7*a* and 7*b* show the change plates according to FIGS. 6*a* and 6*b*, respectively, in a cross-section longitudinally to the direction of passage of material through the press.
Figure 7B:
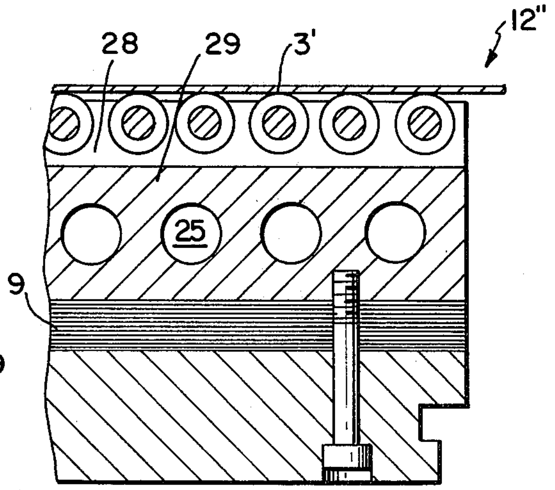
Figure 8A:
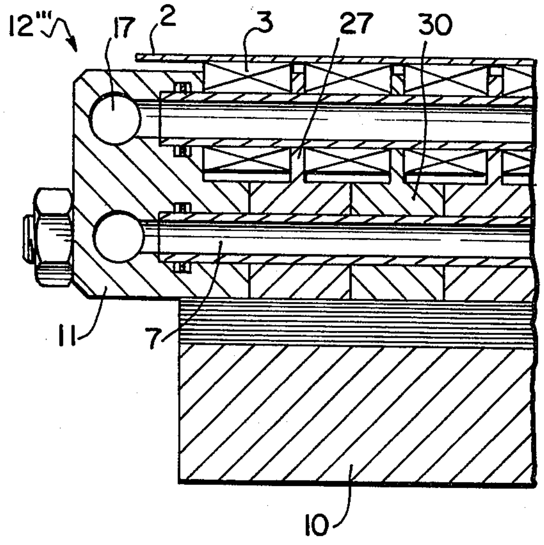
FIGS. 8*a* and 8*b* show change plates in a cross-section transverse to the direction of passage of material through the press.
Figure 8B:
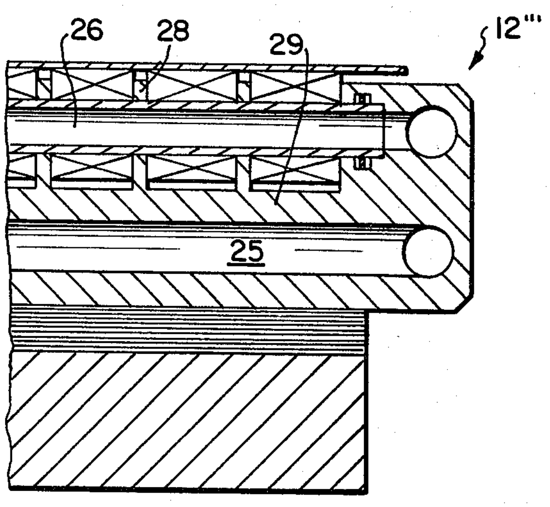
Figure 9A:
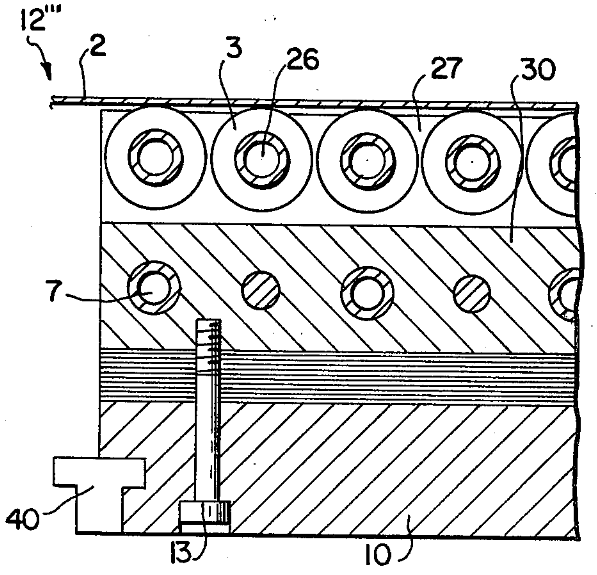
FIGS. 9*a* and 9*b* show the change plates according to FIGS. 8*a* and 8*b*, respectively, in a cross-section longitudinally to the direction of passage of material through the press.
Figure 9B:
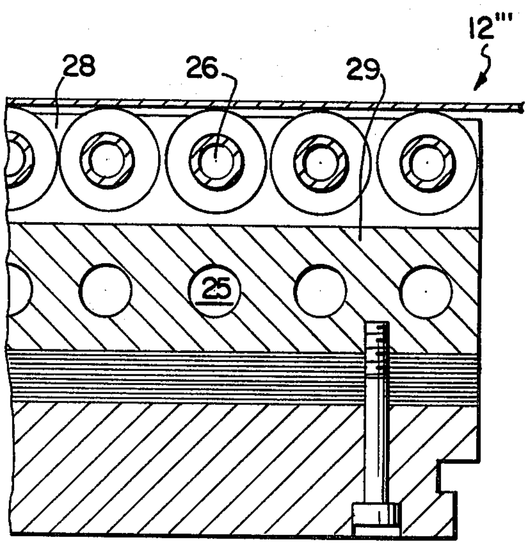

According to the embodiments of the change plate shown in FIGS. 4, 5, *8a, 8b, 9a* and *9b*, the heating installation consists of the fact that the rods 6 of FIGS. 2 and 3 are in the form of pipes 26 and that on both longitudinal sides of the plate, two or more distributor plates 11, with heating and/or cooling channels 17, are mounted on the pressure plates. By means of a suitable fluid, pumped from the channels 17 through the pipes 7, 26 and the channels 25, the rolls 3 and the steel bands 2, may be heated or cooled directly.

Indirect heating of the rolls, when extremely small rolls 3′ (shown in FIGS. 2, 3, *6a, 6b, 7a* and *7b*) with a very small diameter are required, may be effected through the web plates 23, 27 and the rods 6, by heating the pressure plates 24, when the rods and possibly the pressure plates and the pipes are made of a material with a high thermal conductivity. The rolls 3 and 3′ are intended to signify devices using both slide bearings and commercially available ball bearings, roll bearings, needle bearings and simple steel or synthetic plastic rolls with bushings. The specific bearings to be used in actual practice depends on the type of application of the press, wherein the temperature required by the material to be pressed during the manufacturing process, is of particular importance.

An increase in the life of the steel bands may be achieved by the arrangement of different distances of rods 6 with respect to each other and by different roll diameters, and further by a possible arrangement wherein the rolls on one rod 6 engage the free spaces of another rod 6 by means of gears (not shown). The steel bands may be further protected by cutting the web plates 23, 27 and 28 at the web between each rod 6, to the foot of the web plates or to the pressure plates 24 and 29. One such cut 41 is shown in FIG. 3 in phantom.

The above description of the preferred embodiments of the press of the present invention is meant to be descriptive but not limitative. Clearly, numerous modifications, additions or changes can be made to the present invention without departing from the scope thereof as set forth in the appended claims.

What is claimed is:

1. An apparatus for continuously receiving and pressing material for producing particleboard and fiberboard, comprising:

(a) pressing means comprising a movable upper platen and a fixed lower platen;

(b) a ram mounted to said upper platen to move said upper platen to define a press gap between said upper platen and said lower platen for receiving material to be pressed;

(c) a first endless conveyor band disposed around said lower platen;

(d) a second endless conveyor band disposed around said upper platen;

(e) a plurality of rolls for supporting and guiding said first and second bands, respectively; and (f) support means for said rolls, comprising: a plurality of change plates, each of said change plates being removably mounted to said lower platen or said upper platen and including: a first rod mounted in a first level and connected in supporting relation with one of said rolls, a plurality of T-shaped web plates connected to said first rod in said first level and to a pressure plate in a second level, whereby material moved between said upper platen and said lower platen is subjected to pressure to form a compressed product and counter pressure from said material being pressed is transferred to said pressure plate.

2. The apparatus of claim 1 wherein said pressure plate is equipped with heating channels in the form of bores.

3. The apparatus of claim 1 wherein said pressure plate and a plurality of web plates are made of a single piece.

4. The apparatus of claims 1 or 2 wherein said pressure plate is formed of a plurality of components and one of said web plates is formed as an integral unit with one of said components of said pressure plate.

5. The apparatus of claim 1 wherein each change plate further includes an insulating plate and a mounting plate, wherein said insulating plate is disposed between said mounting plate and said pressure plate.

6. The apparatus of claim 1 or 5 wherein each change plate contains a plurality of rolls received on said first rod.

7. The apparatus of claim 1 wherein said rod mounts a plurality of rolls and said rolls are spaced at unequal intervals along said rod.

8. The apparatus of claims 1 or 7 wherein said T-shaped web plates have cutouts formed therein.

* * * * *